United States Patent
Black et al.

(10) Patent No.: US 7,856,797 B2
(45) Date of Patent: Dec. 28, 2010

(54) AUTOMATED COLLECTOR DEVICE AND METHODS

(75) Inventors: Derek D. Black, Austin, TX (US); Stephen Grupinski, Wimberly, TX (US); Joseph Geisinger, Austin, TX (US)

(73) Assignee: Arm Automation, Inc., Austin, TX (US)

( * ) Notice: Subject to any disclaimer, the term of this patent is extended or adjusted under 35 U.S.C. 154(b) by 0 days.

(21) Appl. No.: 12/062,171

(22) Filed: Apr. 3, 2008

(65) Prior Publication Data

US 2009/0249750 A1 Oct. 8, 2009

(51) Int. Cl.
*B65B 35/30* (2006.01)

(52) U.S. Cl. .............................. 53/447; 53/147; 53/540; 53/247; 700/213

(58) Field of Classification Search .................. 53/443, 53/447, 446, 147, 537, 540, 541, 543, 544, 53/247; 198/347.1; 901/7; 700/213, 217, 700/218
See application file for complete search history.

(56) References Cited

U.S. PATENT DOCUMENTS

| | | | |
|---|---|---|---|
| 4,124,967 A * | 11/1978 | Beer et al. ..................... 53/446 |
| RE30,016 E * | 5/1979 | Hohn ......................... 700/253 |
| 4,283,165 A * | 8/1981 | Vertut ........................ 414/733 |
| 4,522,292 A | 6/1985 | Euverard et al. |
| 4,608,808 A | 9/1986 | Ryan et al. |
| 4,692,876 A * | 9/1987 | Tenma et al. ................ 700/249 |
| 4,699,559 A | 10/1987 | Bibbo et al. |
| 4,856,263 A | 8/1989 | Schneider et al. |
| 4,864,801 A * | 9/1989 | Fallas ........................... 53/446 |
| 4,870,807 A * | 10/1989 | Palamides et al. ............. 53/528 |
| 4,995,224 A * | 2/1991 | Yourgalite et al. ............ 53/540 |
| 5,078,255 A * | 1/1992 | Haley ......................... 198/358 |
| 5,109,650 A * | 5/1992 | Hogenkamp .................. 53/443 |
| 5,353,576 A * | 10/1994 | Palamides et al. ............. 53/540 |
| 5,403,056 A * | 4/1995 | Wallace ...................... 294/98.1 |
| 5,611,193 A * | 3/1997 | Farrelly ........................ 53/475 |
| 5,778,640 A | 7/1998 | Prakken et al. |
| 5,855,105 A | 1/1999 | Ferris |
| 5,907,946 A * | 6/1999 | Oishi et al. .................... 53/471 |
| 6,052,969 A * | 4/2000 | Hart et al. ..................... 53/447 |
| 6,082,797 A * | 7/2000 | Antonette ................. 294/103.1 |
| 6,105,952 A * | 8/2000 | Helmstadter et al. ........ 271/3.02 |
| 6,164,045 A | 12/2000 | Focke et al. |
| 6,371,717 B1 * | 4/2002 | Grams et al. ............. 414/416.09 |
| 6,412,253 B1 * | 7/2002 | Meyer et al. ................... 53/399 |
| 6,619,014 B2 * | 9/2003 | Muller ......................... 53/399 |
| 6,725,629 B2 | 4/2004 | Pearce et al. |
| 6,955,029 B2 * | 10/2005 | Palumbo ...................... 53/469 |
| 6,978,586 B2 | 12/2005 | Kilby et al. |
| 7,018,163 B2 * | 3/2006 | Beavers et al. .............. 414/772 |
| 7,069,708 B2 * | 7/2006 | Ishii et al. ..................... 53/540 |
| 7,096,650 B2 | 8/2006 | Van Dam |
| 7,216,470 B2 * | 5/2007 | Nishida ........................ 53/520 |
| 7,219,485 B2 * | 5/2007 | Battisti ......................... 53/542 |

(Continued)

*Primary Examiner*—Paul R Durand (57) ABSTRACT

A collector device includes a collector connected to a positioner, such as a robot arm. The positioner can automatically move the collector in multiple dimensions to collect objects into the collector according to a specified collection pattern. By moving the collector in multiple dimensions, the positioner provides for objects to be arranged in the collector according to a specified pattern. The positioner can also move the collector so that the collected objects are transferred to a second collector for shipping, storage, and the like.

20 Claims, 12 Drawing Sheets

U.S. PATENT DOCUMENTS

| | | | |
|---|---|---|---|
| 7,310,922 B2 * | 12/2007 | Carrigan et al. | 53/399 |
| 2003/0120387 A1 * | 6/2003 | Sherwin | 700/245 |
| 2004/0240979 A1 * | 12/2004 | Beavers et al. | 414/788 |
| 2006/0120850 A1 * | 6/2006 | Clark et al. | 414/789.5 |
| 2008/0000203 A1 * | 1/2008 | Gilmore et al. | 53/475 |
| 2008/0142398 A1 * | 6/2008 | Carrigan et al. | 206/499 |

* cited by examiner

AUTOMATED COLLECTOR DEVICE AND METHODS

FIELD OF THE DISCLOSURE

The present disclosure relates to devices and methods for automatically arranging objects into a collector.

BACKGROUND

It is sometimes desirable to automate the process of collecting objects into a collector, such as a container. Such automation typically reduces costs and improves the efficiency of the collection process. However, with conventional methods of collecting objects into a collector, it can be difficult for objects to be arranged in the collector according to a desired pattern, thereby requiring human intervention to arrange the objects. Such human intervention can undesirably reduce the efficiency of collecting the objects. Accordingly, an improved device and methods for collecting objects into a collector would be desirable

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

A collector device includes a collector connected to a positioner, such as a robot arm. The positioner can automatically move the collector in multiple dimensions to collect objects into the collector according to a specified collection pattern. By moving the collector in multiple dimensions, the positioner provides for objects to be arranged in the collector according to a specified pattern. The positioner can also move the collector so that the collected objects are transferred to a second collector for shipping, storage, and the like.

Figure 1:
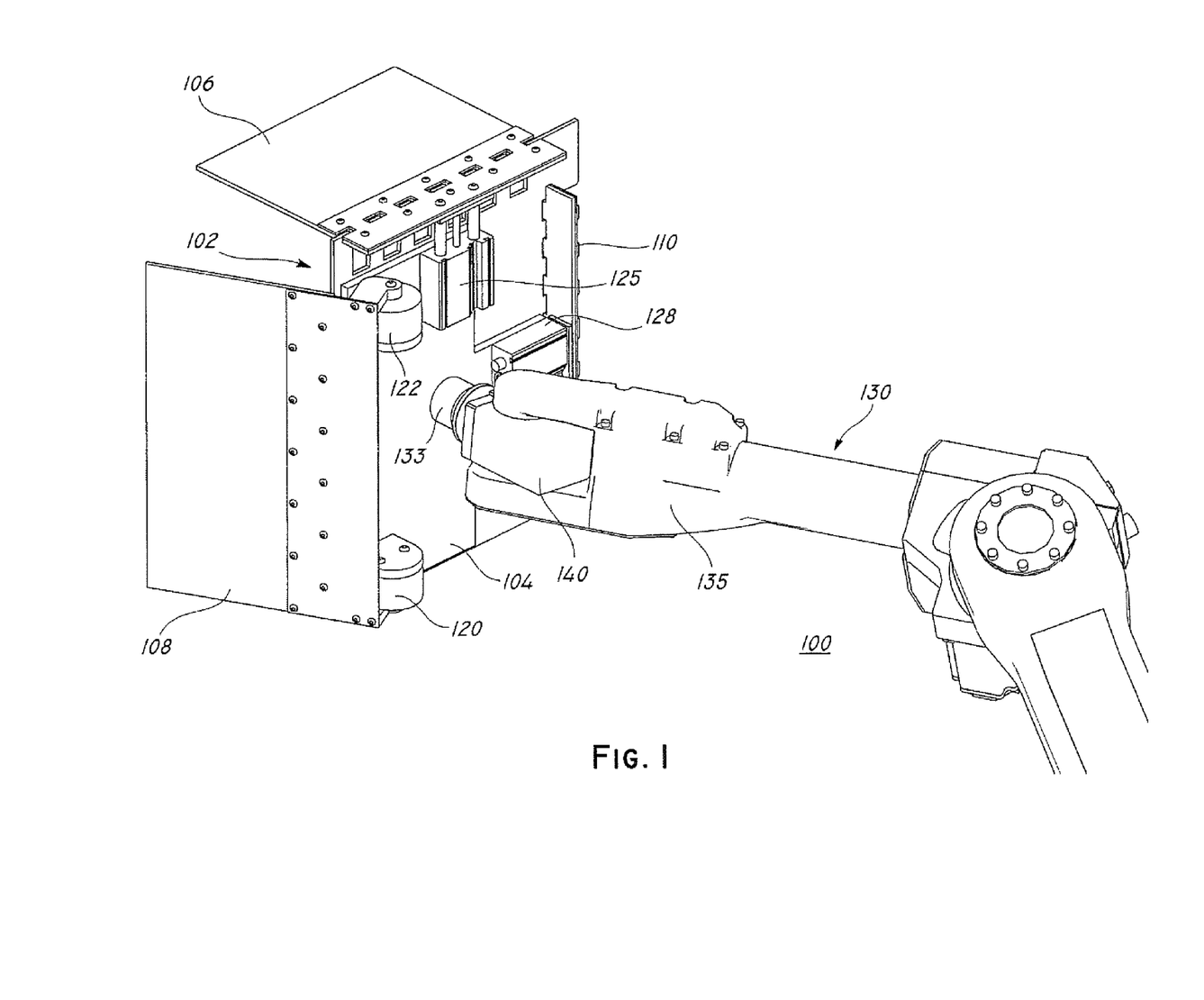
FIG. 1 is a bottom view of a collector device in accordance with one embodiment of the present disclosure.

Referring to FIG. 1, a bottom view of a particular embodiment of a collector device 100 is illustrated. The collector device 100 includes a collector 102 and a positioner 130. As used herein, a collector refers to a physical implement used to collect two or more objects, and can include a shipping container, a storage container, an intermediate collector where objects are collected prior to being placed in a shipping or storage container, and the like. A collector can also include an implement for collecting two or more objects for further processing, such as a pan that collects food for cooking or dough for baking. In the illustrated embodiment, the collector 102 includes a number of faces, including a base 104 and side faces, or walls, 106, 108, and 110. The collector 102 also includes an additional side face opposite the side face 106, not visible in the illustrated view of FIG. 1. In the illustrated embodiment of FIG. 1, the side face 108 is coupled to the base 104 by rotary actuators 120 and 122. The side faces 106 and 110 are coupled to the base 104 by linear actuators 125 and 128, respectively. In other embodiments, one or more of the side faces 106, 108, and 110 can be fixably attached to the base 104 via a fastener or by physically integrating the base 104 and side face as a single physical unit. Further, in other embodiments the collector 102 can have a semi-spherical shape, a polyhedral shape, or a more complex shape, such as a shape having multiple chambers for collection of objects. For example, in another embodiment the collector 102 can be configured in the shape of a muffin pan, for collection of objects in each chamber of the pan.

In addition, as used herein an object can refer to a discrete solid object, or to a specified amount of liquid or semi-solid material. Thus, an object can be a bag of potato chips, a specified amount of bread dough, a specified amount of carbonated beverage, or any other item that can be collected in the collector 102.

In the illustrated embodiment of FIG. 1, the positioner 130 is a robot arm including a chain of rotational postioners, including a rotational positioner 135 and a rotational positioner 140. In the illustrated embodiment, the positioner 130 is attached to the collector 102 by a collector mount 133 which attaches the rotational positioner 140 to the base 104. In other embodiments, the positioner 130 can be attached to the collector 102 via one or more of the side faces. In addition, in the illustrated embodiment the collector mount 133 is attached to the collector 102 by mechanical means, such as by bolting or welding the collector 102 to the collector mount 133. In other embodiments, the collector 102 can be attached to the collector mount 133 via a chemical substance, such as a glue or epoxy or via a mechanical attachment, such as a vacuum cup.

The rotational positioner 135 is a portion of the positioner 130, such as an arm, that is configured to move the collector 102 along one or more of the three Cartesian dimensions. As used herein, a Cartesian dimension refers to a dimension oriented as a lateral direction (i.e., an x, y, or z direction, or a left-right, up-down, or backward-forward direction) relative to the collector 102. The rotational positioner 140, is configured to rotate the collector 102 in order to change its position along one or more rotational dimensions (e.g. pitch, roll, and yaw dimensions). The positioner 130 can also include other positioners, rotational or linear, to change a position of the collector 102. For example, in one embodiment the collector mount 133 is a rotational positioner that can rotate the collector 102 relative to the positioner 130. Accordingly, the positioner 130 is configured to provide the collector 102 with six degrees of freedom of motion.

Thus, the collector 102 can be automatically moved in multiple dimensions to catch objects in such a way that the objects are collected according to a specified pattern. This provides additional flexibility for collecting objects in the collector 102. For example, one method of placing objects into a container can be having an automated assembly pick an individual object from a collection assembly and place the object into a container. Another method can include catching objects in a collector, placed at the end of a feed assembly, such as a conveyor. Still another method includes pushing one or more objects into a collector with an automated pushing assembly. With each of these methods, if the collector is stationary, or able to move in only one dimension, the pattern of the collected objects in the collector is limited. However, by moving the collector 102 in multiple dimensions, the number and type of collection patterns that can be implemented is enhanced.

Referring again to FIG. 1, the rotary actuators 120 and 122 of the collector 102 are configured to be controlled to rotate the side face 108 relative to the base 104. The linear actuators 125 and 128 are configured to be controlled to move the side faces 106 and 110, respectively, laterally relative to the base 104. Accordingly, the side faces 106, 108, and 110 can be rotated or moved to change the interior shape and dimensions of the collector 102.

Figure 2:
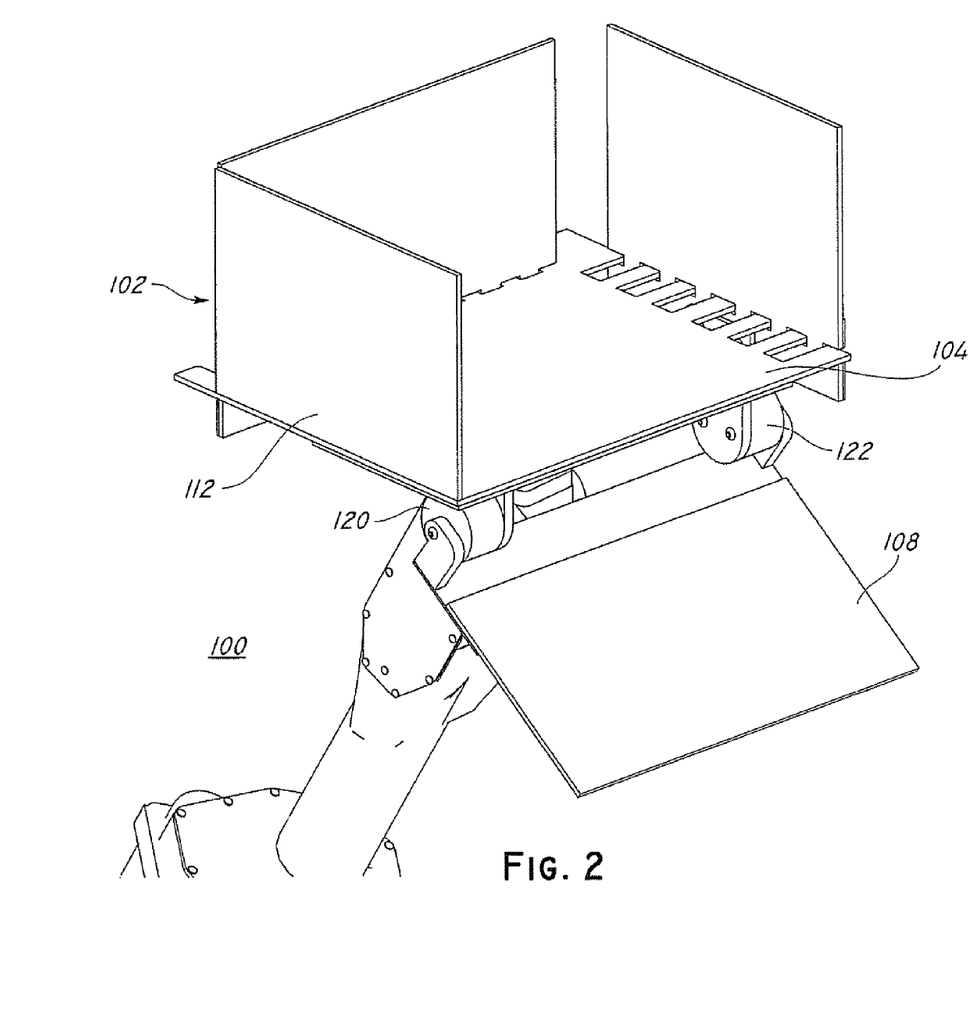
FIG. 2 is a top view of the collector device of FIG. 1.

FIG. 2 illustrates a top view of the collector device 100. In this view an additional side face, illustrated as side face 112, is depicted. The side face 112 can be fixably attached to the base 104, or coupled to the base 104 via linear or rotational actuators, or a combination thereof FIG. 2 further illustrates the side face 108 rotated by the rotary actuators 120 and 122 into an open position, allowing freer access to the interior of the collector 102.

Figure 3:
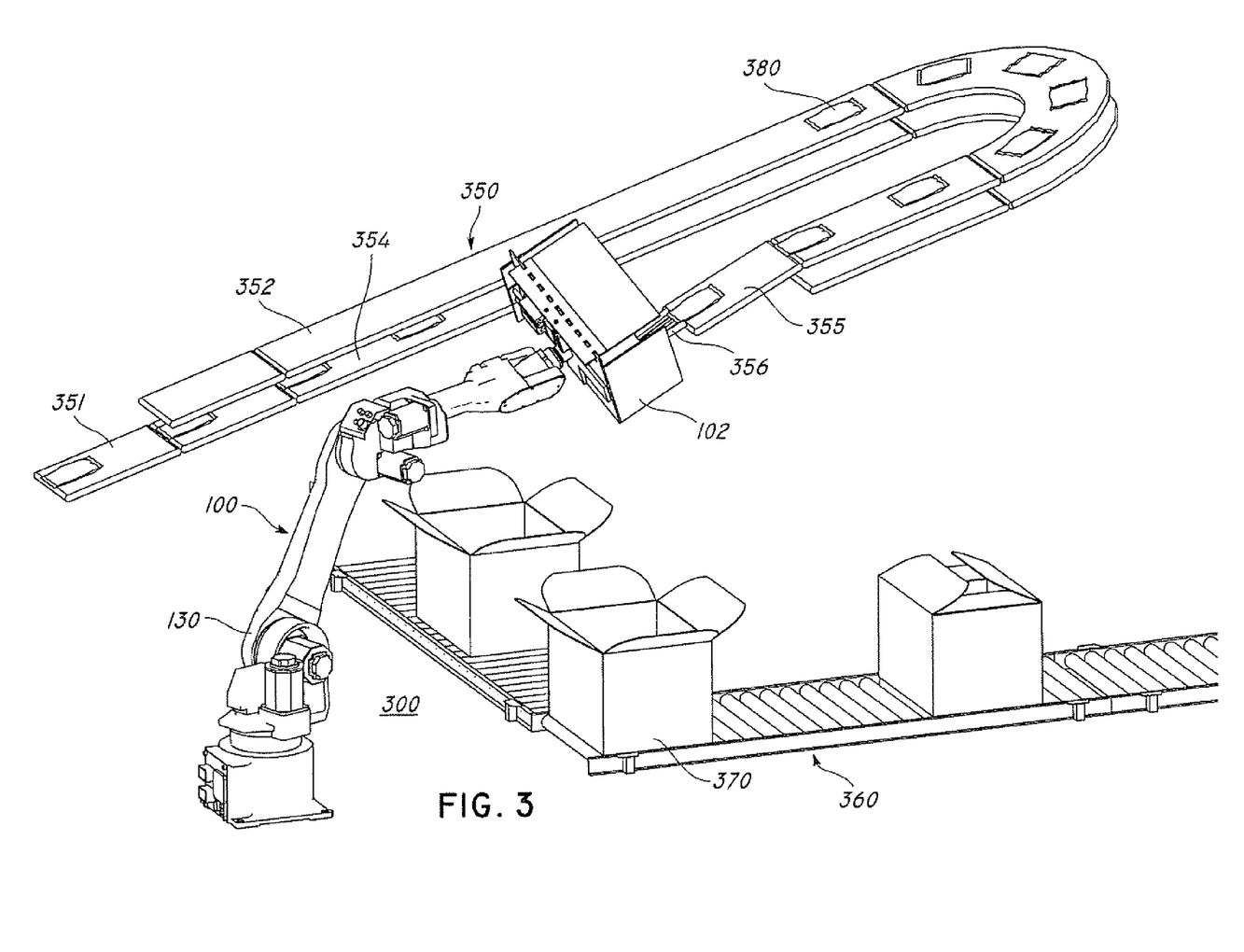
FIG. 3 is side view of a collector system including the collector device of FIG. 1.

FIG. 3 illustrates a collector system 300 including the collector device 100. The collector system 300 also includes an accumulator assembly 350, a selector 351, a feed assembly 356, a selector 355, a container provision assembly 360, and a container 370.

The accumulator assembly 350 is a device configured to accumulate products for collecting with the collector device 100. In the illustrated embodiment, the accumulator assembly includes conveyors 352 and 354, a selector 351, and a selector 355. The selector 351 is configured to selectively provide objects from a provision assembly (not shown) to the conveyors 352 and 354 in order to meter a select number of objects into a group of objects on the selected conveyor. Thus, in the illustrated embodiment, sets of objects to be collected (e.g. object 380) are alternately placed by the selector 351 on conveyors 352 and 354. The conveyors 352 and 354 are configured to move objects placed on each conveyor towards the selector 355. This allows each of the conveyors 352 and 354 to continuously move towards the selector 355. The selector 355 is selectively coupled to the conveyors 352 and 354 to form a continuous path between the selected conveyor and the feed assembly 356. The selector 355 is controlled such that, as a set of objects reaches the end of the conveyor 352 or 354, the selector 355 is coupled to the appropriate conveyor to provide the set of objects to the feed assembly 356. Thus, the combination of the conveyors 352 and 354 and the selector 355 provides for a buffering of sets of objects to be collected. This allows for sets of objects to be continuously provided to the collector system 300, improving system efficiency.

The feed assembly 356 provides objects from the selector 355 to the collector 102. In the illustrated embodiment, the feed assembly 356 is a funnel to provide objects to the collector 102 one at a time. Other feed assemblies can include pressure feed assemblies, which apply pressure to objects to force the objects into the collector 102, drop feed assemblies, which can drop objects into the collector 102 using a guide or other assembly, and the like. The container provision assembly 360 is configured to provide containers for transfer of objects from the collector 102. In the illustrated embodiment, the container provision assembly 360 is a roller table. Containers, such as container 370, can be moved along the roller table automatically by robot arms (not shown) or other automated processes.

The collector device 100 is controlled to automatically collect sets of objects provided by the feed assembly 356 into the collector 102 by catching the objects so that the objects are arranged according to a specified pattern. In particular, the positioner 130 is controlled by a robot positioning control device (not shown) to change the position of the collector 102 in order to catch the sets of objects according to a specified pattern. Once a specified number or set of objects has been collected, the collector device is further configured to transfer the objects to the container 370. These operations can be better understood with reference to FIGS. 4-10.

Figure 4:
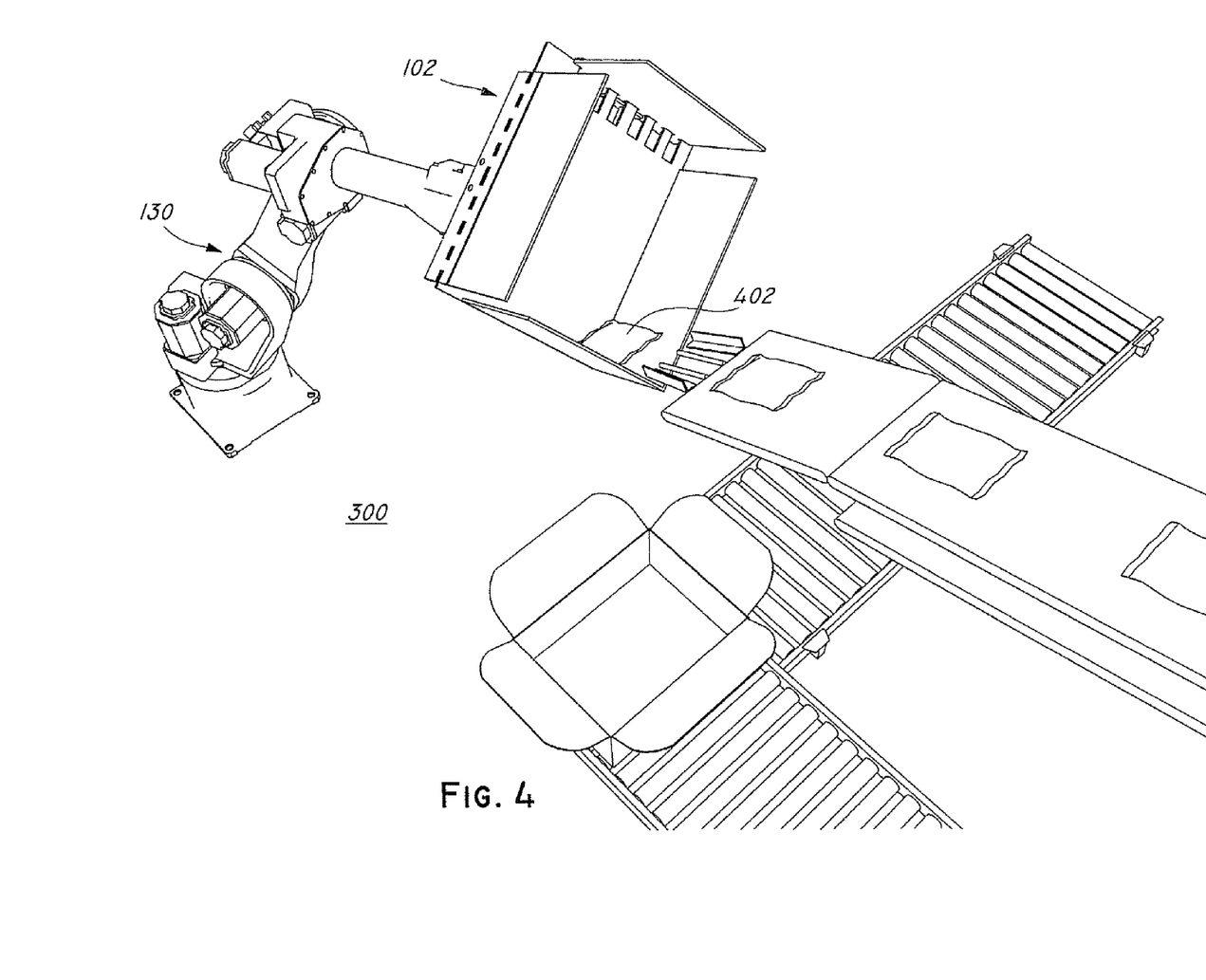
FIG. 4 is an alternative view of the collector system of FIG. 3.
Figure 5:
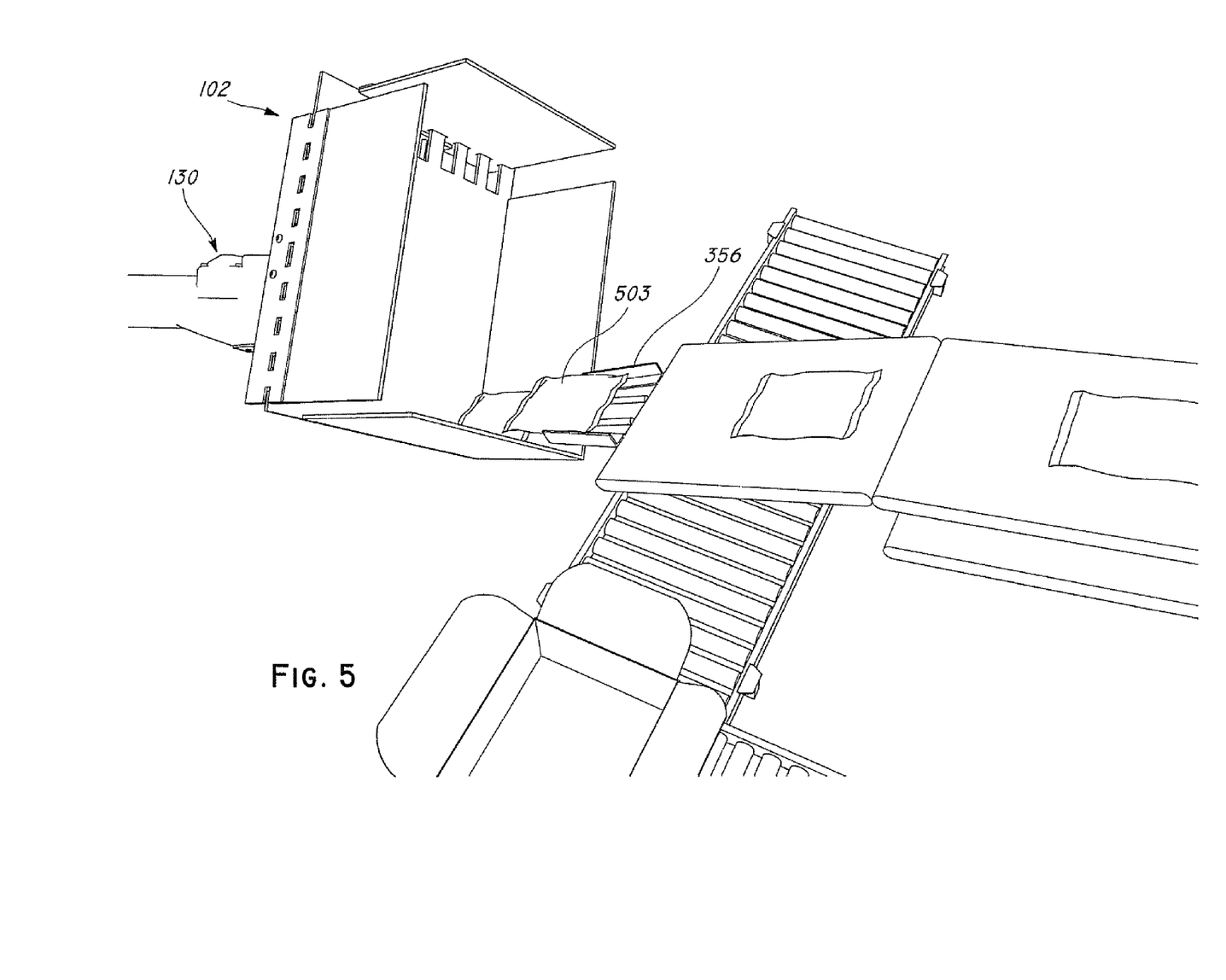
FIG. 5 is another view of the collector system of FIG. 3.

FIG. 4 illustrates another view of the collector system 300. In this view, the positioner 130 has positioned the collector 102 based on a specified pattern such that a first object, object 402, is placed in a first specified location in the collector. As illustrated in FIG. 5, to place a second object in the collector 102, object 503, the positioner 130 changes the position of the collector 102 relative to the feed assembly 356. Because the positioner 130 provides the collector 102 with six degrees of freedom of movement, the collector 102 can be moved along one or more Cartesian dimensions, one or more rotational dimensions, or any combination thereof, in order to place the collector 102 in the position indicated by the specified collection pattern.

Figure 6:
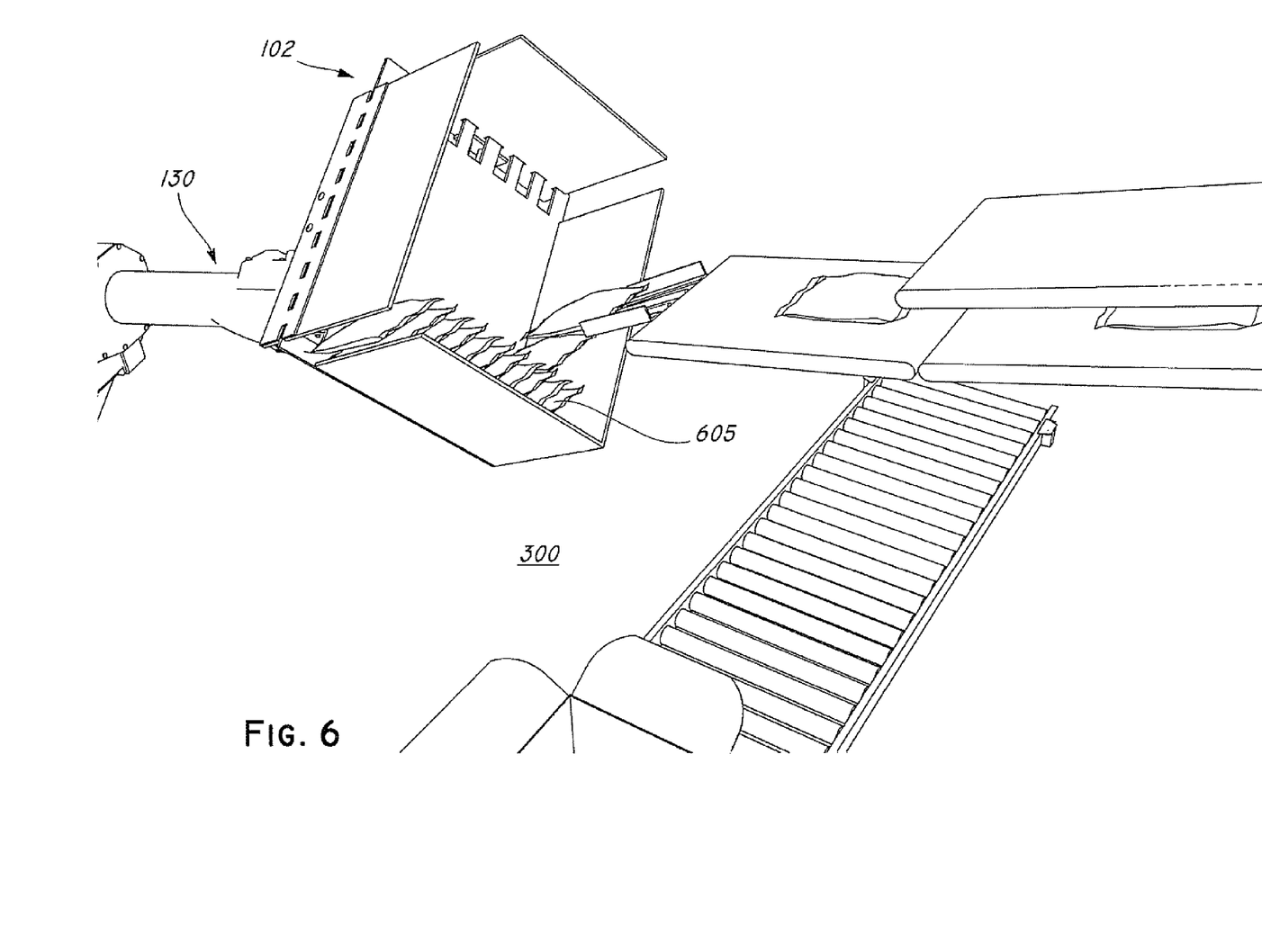
FIG. 6 is a view of the collector system of FIG.3 illustrating the collection of multiple objects.

FIG. 6 illustrates the collector system 300 as the collector 102 continues to be collected. In the illustrated embodiment of FIG. 6, a first row 605 of objects has been collected into the collector 102. Accordingly, the positioner 130 repositions the collector 102 so that another row of objects is collected.

Figure 7:
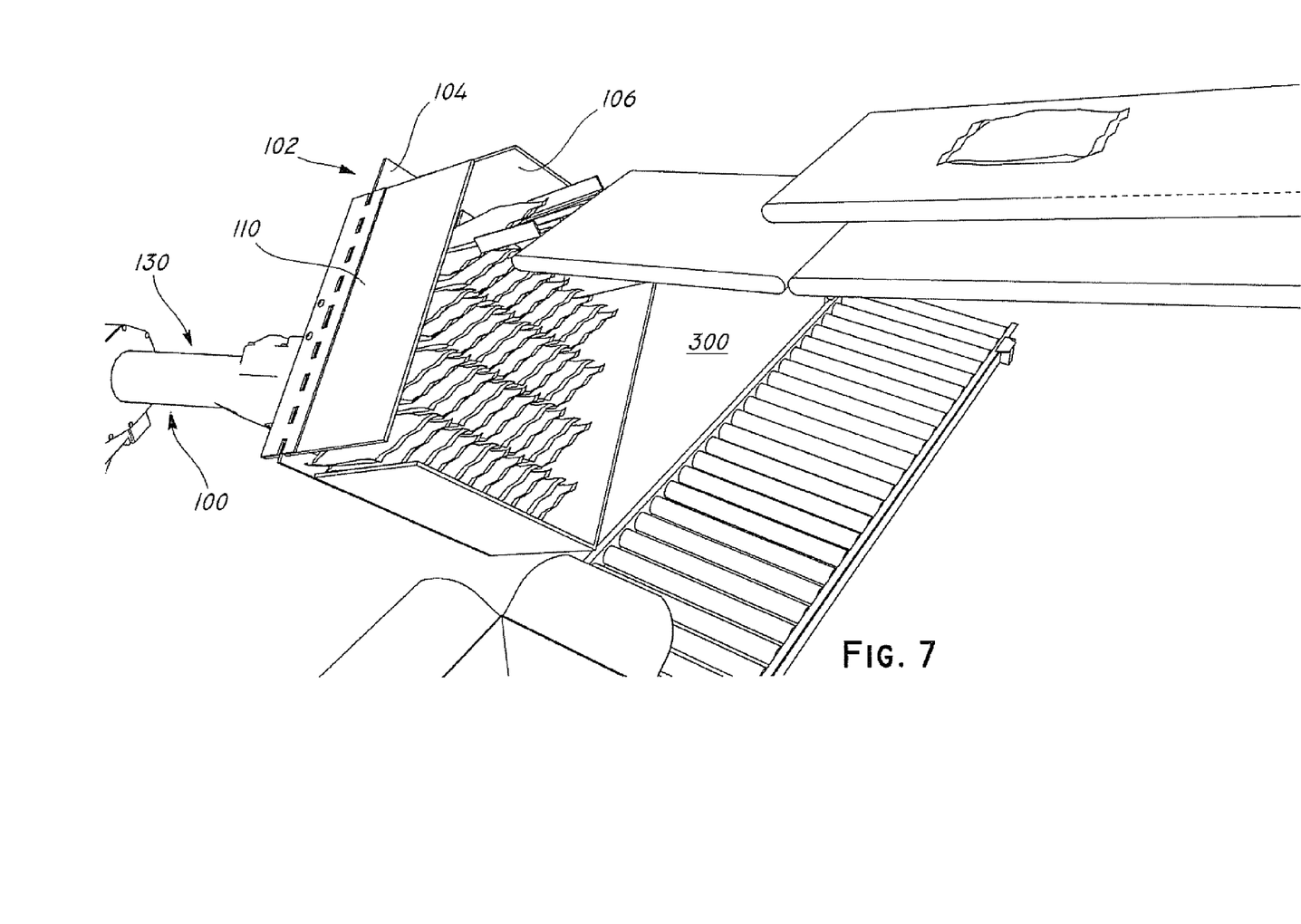
FIG. 7 is a view of the collector system of FIG. 3 illustrating collecting of objects according to a specified pattern.

FIG. 7 illustrates the collector system 300 as the collecting of a set of objects into the collector 102 is nearly complete. As illustrated in FIG. 7, the poistioner 130 continues to adjust the position of the collector 102 to collect objects into the collector according to a specified pattern. In addition, the sides of the collector 102 can be manipulated by the collector device 100 in order to collect objects into the collector. For example, while objects are being collected, the linear actuators 125 or 128, or a combination thereof, can be controlled to move the side faces 106 and 110, respectively, relative to the base 104 in order to compress the collected objects into a specified position, and shrinking the size of the footprint of the group of collected objects. After the objects have been pushed, the linear actuators 125 and 128 can be controlled to return the side faces 106 and 110 to their original position or into another position that allows for collecting of additional objects.

Figure 8:
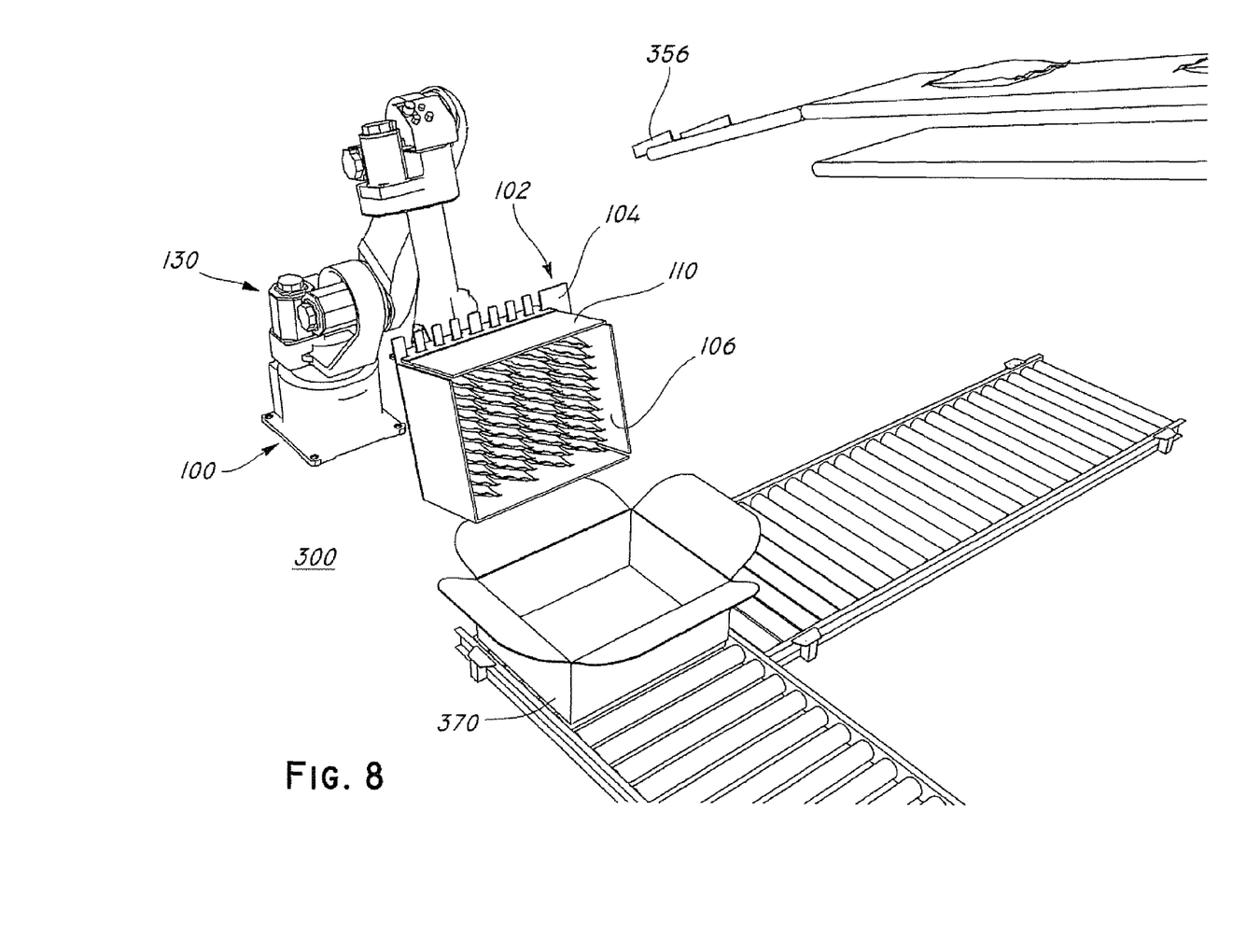
FIG. 8 is a view of the collector system of FIG. 3 illustrating collecting of objects into a shipping container.

FIG. 8 illustrates the collector system 300 after a set of objects has been collected into the collector 102. Once the set of objects has been collected at the collector 102, the positioner 130 moves the collector 102 away from the feed assembly 364, and in position for transfer to the container 370. In particular, the collector system 100 can control the positions of the side faces 106 and 110 so that the interior dimensions of the collector 102 are approximately the same as the interior dimensions of the container 370, providing for efficient transfer of the objects to the container 370. In addition, the positioner 130 rotates and laterally positions the collector 102 so that the sides of the base 104 are aligned with the sides of the base of the container 370, to ready the objects for transfer.

Figure 9:
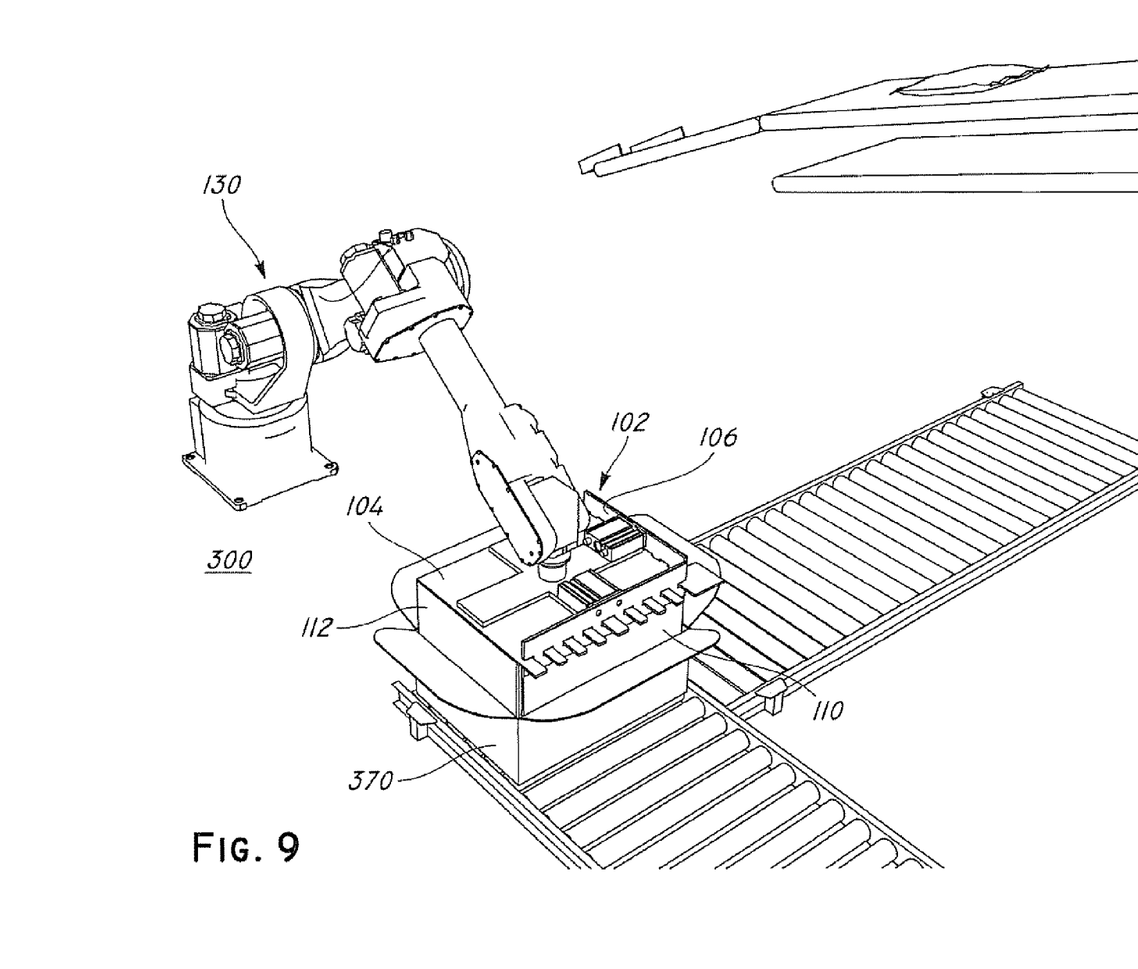
FIG. 9 is an alternate view of the collector system of FIG. 8 illustrating collecting of objects into a shipping container.

FIG. 9 illustrates the collector system 300 as objects are transferred from the collector 102 to the container 370. As illustrated, the positioner 130 changes the position of the collector 102 along two or more dimensions so that the collector 102 is placed above or inside the container 370, and further positions the collector 102 so that the base 104 is above the side faces 106, 108, 110, and 112, such that gravity effectuates the transfer of the objects from the collector 102 to the container 370.

Figure 10:
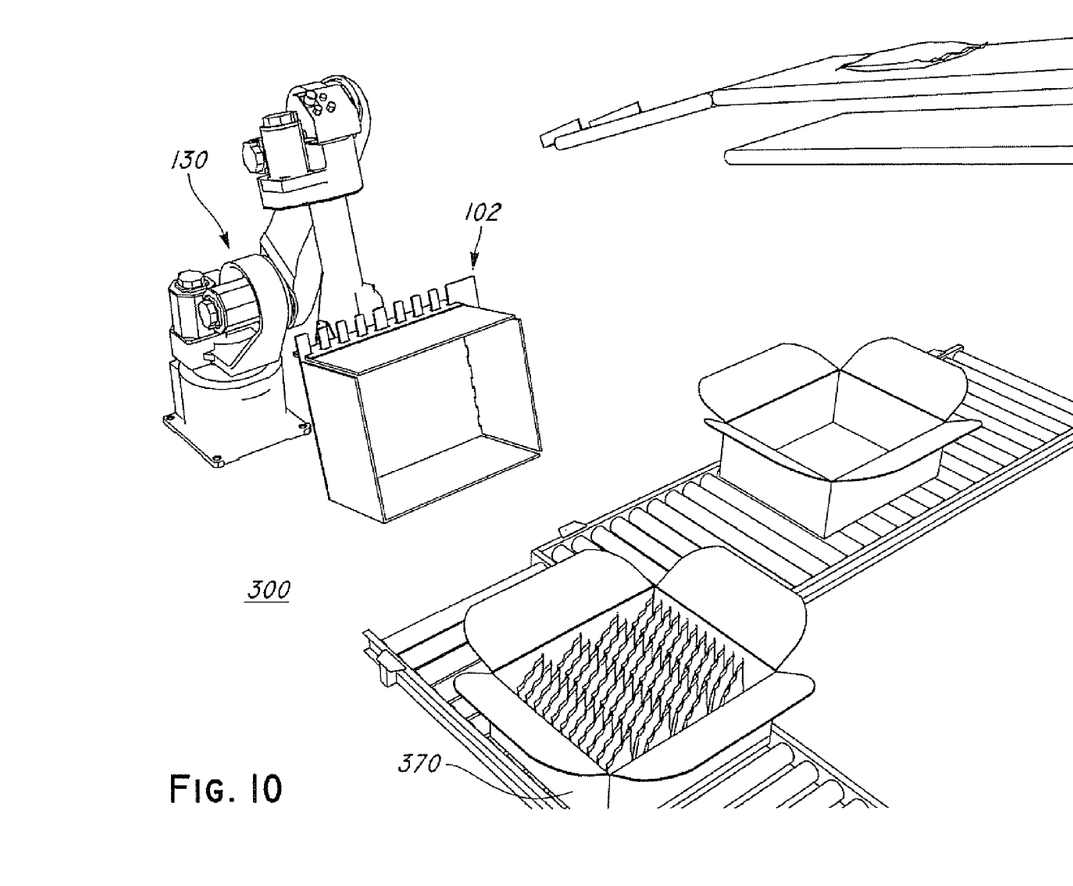
FIG. 10 is a view of the collector system of FIG. 3 illustrating a loaded shipping container.

As illustrated in FIG. 10, after transferring the objects the positioner 130 repositions the collector 102 so that it is no longer aligned with the container 370. This allows the container 370 to be closed, sealed, moved to another position in the collector system 300, and the like. In addition, after transferring the objects to the container 370, the positioner 130 can return the collector 102 to the position illustrated in FIG. 4, in order to collect another set of objects.

Referring again to FIG. 3, it will be appreciated that the collector 102 can be moved in two or more dimensions in order to collect the objects according to a specified pattern. Thus, in some embodiments, the collector 102 is moved in three dimensions, whereby the collector 102 is moved or rotated such that the angle of the base 104 relative to an angle of entry of the set of objects being collected changes as the set of objects is collected. Further, during collection of a set of objects, the collector 102 can be raised, lowered, moved from side-to-side, and rotated in order to change the position of the collector 102 relative to the incoming path of the objects being collected in order to arrange the objects according to the specified pattern.

Figure 11:
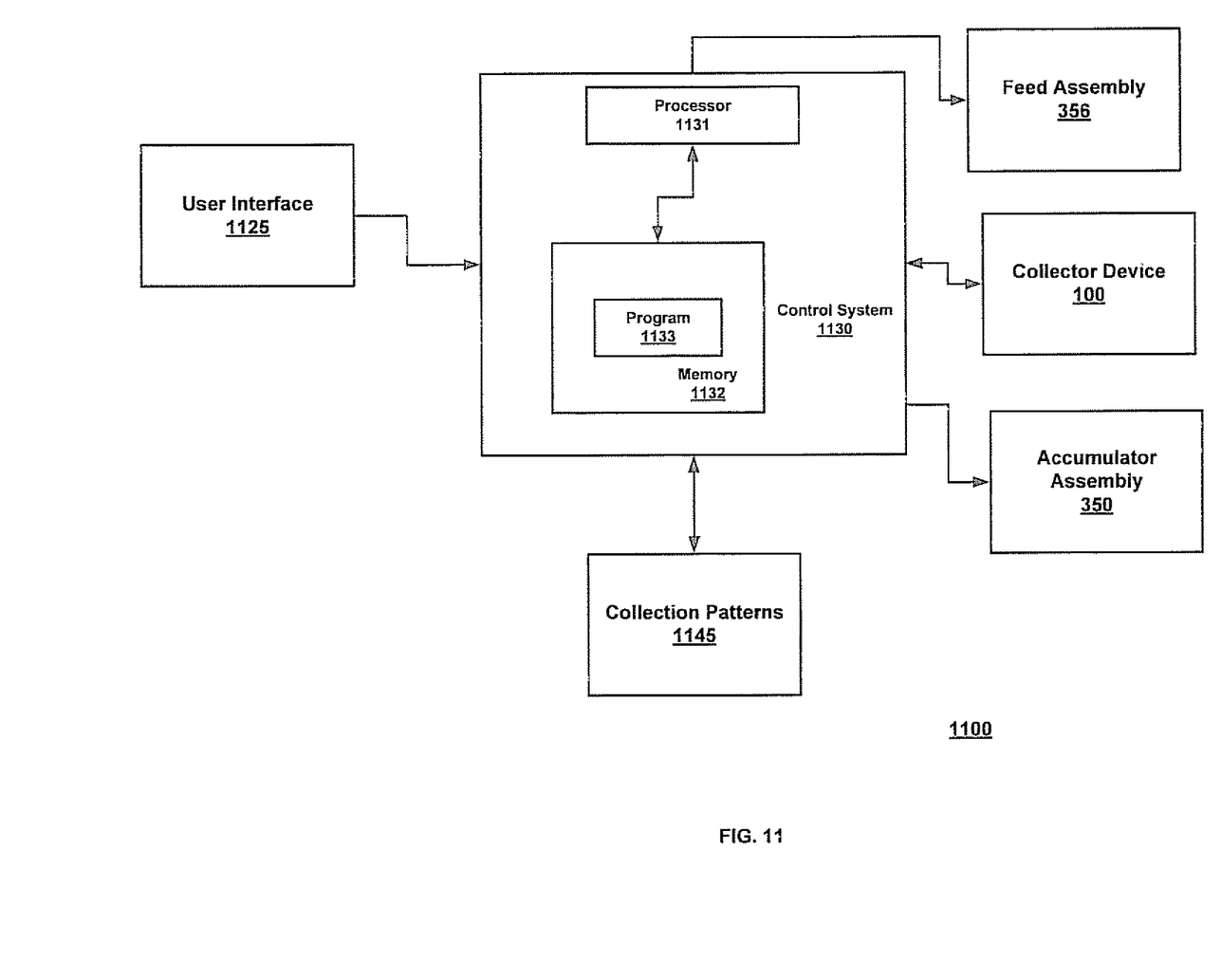
FIG. 11 is a block diagram of a control system for the collector device of FIG. 1 in accordance with one embodiment of the present disclosure.

FIG. 11 illustrates a block diagram of a particular embodiment of a control system 1100. The control system 1100 includes the collector device 100, the feed assembly 356, a user interface 1125, a control system 1130, and collection patterns 1145. The collection patterns 1145 represent specified movement patterns for the positioner 130 of the collector device 100. The collection patterns 1145 can be stored in a memory (not shown) such as volatile memory (e.g. RAM memory) or non-volatile memory (e.g. flash memory or a hard disk) of the control system 1130.

The control system 1130 is a computer system configured to access a selected one of the collection patterns 1145 and, based on the selected collection pattern, provide control information to the collector device 100, to the accumulator assembly 350, and to the feed assembly 356. In particular, the control system 1130 provides control information to control the positioner 130 in order to move the collector 102 according to the selected collection pattern. In addition, the control system 1130 provides control information to the accumulator assembly 350 and the feed assembly 356 to control when objects are serially fed to the collector device 100, so that the objects can be arranged according to the selected collection pattern. In the illustrated embodiment, the control system 1130 is a computer system having a processor 1131 and a memory 1132. The memory 1132 is a computer readable medium, such as volatile memory (e.g. RAM memory) or non-volatile memory (e.g. hard disk or flash memory) that stores a program 1133. The program 1133 is a set of instructions configured to manipulate the processor 1131 so to provide the control information based on the selected collection pattern. The instructions can also be configured to manipulate the processor to access a selected collection pattern based on information provided by the user interface 1125 and can be configured to manipulate the processor to provide control information to the feed assembly 356.

The user interface 1125 is a user interface generated by the control system 1130 or other computer device to allow a user to select one of the collection patterns 1145. In an embodiment, the user interface 1125 is a graphical user interface (GUI) that displays a list of the collection patterns 1145 and allows the user to select one of the collection patterns. The user selection is provided to the control system 1130, which accesses the selected collection pattern and controls the collector device 100 to collect objects according to the selected pattern.

In another embodiment, the user interface 1125 provides an interface to allow a user to create new collection patterns or alter existing collection patterns. The created or altered collection patterns are stored at the collection patterns 1145. Accordingly, specific collection patterns can be created based on the types of objects being collected, the size of collectors being used, and other criteria, in order to provide for efficient collection of objects.

In addition, the control system 1130 controls the collector device 100 in an automated fashion. Thus, upon selecting one of the collection patterns 1145, the control system 1130 can control the collector device to repeatedly place sets of objects into containers according to the selected pattern, without user intervention. This allows containers to be loaded rapidly and efficiently. Further, the control system 1130 controls the feed assembly 356 and the accumulator assembly 350 to control the rate at which objects are provided to the collector device 100, so that the objects are arranged according to the specified pattern. For example, the control system 1130 can periodically start and stop the accumulator assembly 350, or change the rate of speed at which the accumulator assembly 350 provides objects to the feed assembly 356.

Figure 12:
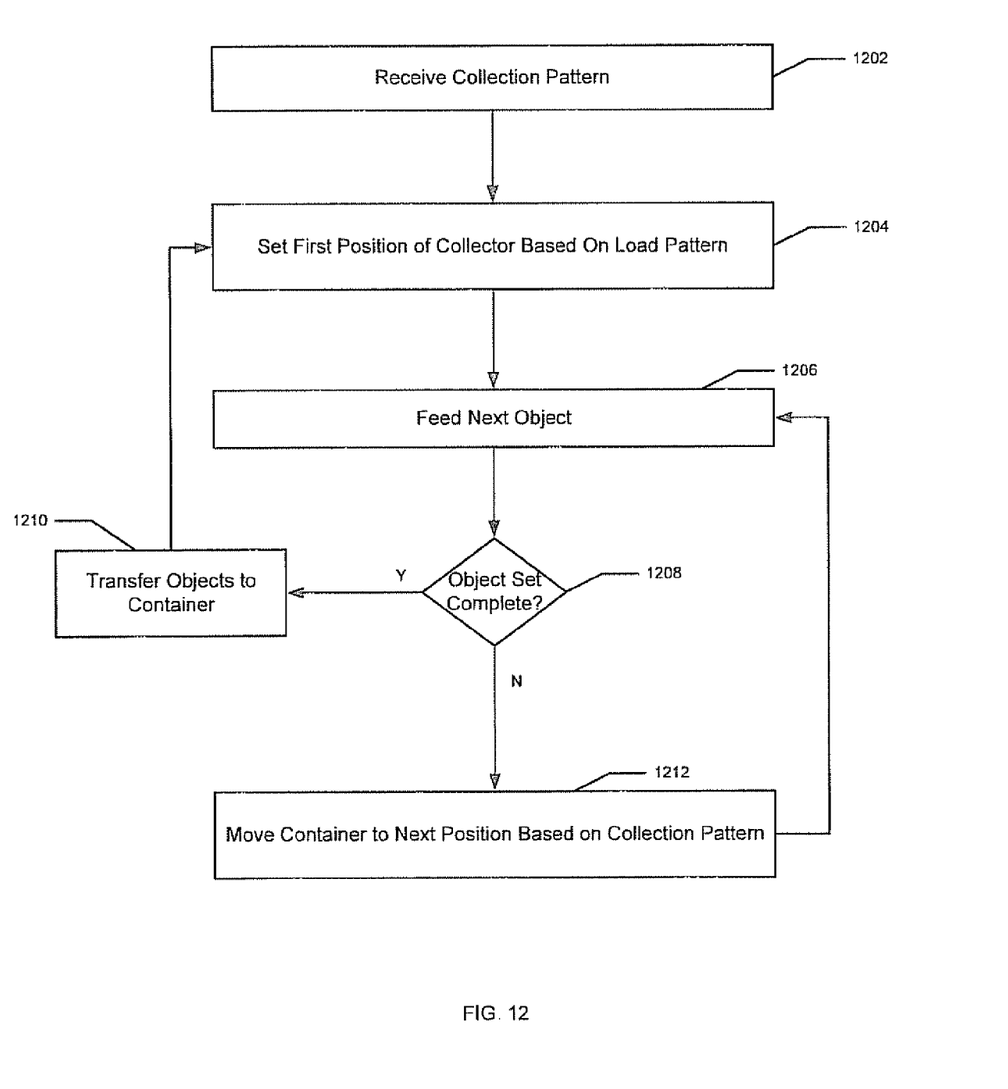
FIG. 12 is a flow diagram of a method of collecting objects in accordance with one embodiment of the present disclosure.

Referring to FIG. 12, a flow diagram of a particular embodiment of receiving objects at a collector is illustrated. At block 1202, a collection pattern is received. In an embodiment, the collection pattern reflects control information for a collector device, such as the collector device 100, whereby the control information controls a position of a collector configured to receive specified objects. At block 1204, a first position of a collector is set based on the received collection pattern. In an embodiment, the collector is set by moving the collector in at least two dimensions, including Cartesian or rotational dimensions, or a combination thereof.

At block 1206, an object is fed into the collector. The object can be fed by sliding, dropping, placing, or otherwise transferring the object to the collector. At block 1208, it is determined whether all objects in a set of objects have been collected at the collector. In an embodiment, this determination is made based on the number of objects that have been fed into the collector. For example, optical readers, such as photoelectric cells, can be employed to count objects as they are passed into the collector. After a set number of objects have been counted, the object set is determined to be complete. In another embodiment, the determination is made based on a position of the collector. For example, if the collector is in a specified end position, or has moved through a specified number of positions, the determination can be made that all objects in the set have been collected.

If, at block 1208, it is determined that all objects in a set have been collected, the method flow moves to block 1210 and the contents of the collector are transferred to another collector, such as a collector for shipping or storage of the objects. In an embodiment, the first collector is moved through at least two dimensions, and up to six dimensions, in order to transfer objects to the second collector. If, at block 1208, it is determined that the object set is not complete, the method flow moves to block 1212 and the collector is moved to the next positions based on the received data pattern. Accordingly, the disclosed method provides for the collector to be moved into a series of positions in order to place a set of objects in the collector according to a specified collection pattern. In addition, the collector can be moved in multiple dimensions, including Cartesian and rotational dimensions, allowing complex collection patterns to be implemented. This in turn provides for more efficient collection of objects.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
serially receiving a first plurality of objects at a first collector;
arranging the first plurality of objects in the first collector according to a pre-determined pattern having a first object displaced horizontally from a second object and a third object displaced vertically from the second object by automatically moving the first collector in two dimensions between receiving the first object at the first collector and receiving the second object at the first collector; and
moving the first collector to simultaneously transfer the plurality of objects from the first collector to a second collector so that the plurality of objects are arranged in the second collector according to the pre-determined pattern.

2. The method of claim 1, wherein arranging the first plurality of objects in the first collector comprises automatically moving the first collector in three dimensions between receiving the first object at the first collector and receiving the second object at the first collector.

3. The method of claim 1, wherein moving the first collector in two dimensions comprise rotating the first collector.

4. The method of claim 1, wherein moving the first collector in two dimensions comprise moving the first collector in two Cartesian dimensions.

5. The method of claim 1, wherein moving the first collector in two dimensions comprise rotating the first collector and moving the first collector in a Cartesian dimension.

6. The method of claim 1, wherein arranging the first plurality of objects in the first collector comprises automatically moving the first collector in six dimensions between receiving the first object at the first collector and receiving the second object at the first collector.

7. The method of claim 1, wherein arranging the first plurality of objects in the first collector comprises automatically rotating a first face of the first collector relative to a second face of the first collector to provide an opening to receive the first plurality of objects.

8. The method of claim 1, wherein arranging the first plurality of objects in the first collector comprises compressing a footprint of the first plurality of objects by automatically moving a first face of the collector laterally relative to a second face of the collector.

9. A method, comprising:
serially receiving a first plurality of objects at a first collector;
arranging the first plurality of objects in the first collector according to a pre-determined pattern having a pre-determined pattern such that a first object of the plurality of objects has a different position and orientation than a second object of the plurality of objects by automatically moving the first collector in two dimensions between receiving the first object at the first collector and receiving the second object at the first collector; and
moving the first collector to simultaneously transfer the plurality of objects from the first collector to a second collector so that the plurality of objects are arranged in the second collector according to the pre-determined pattern.

10. A device, comprising:
a first collector;
a collector mount configured to be coupled to the first collector;
a positioner configured to be coupled to the collector mount and configured to be selectively positioned in three dimensions based on signals provided by a control system;
the control system comprising:
a processor configured to control the positioner;
a computer readable medium that stores a plurality of instructions to manipulate the processor, the instructions comprising instructions to:
move the positioner to arrange a first plurality of objects in the first collector according to a pre-determined pattern having a first object displaced horizontally from a second object and a third object displaced vertically from the second object by automatically moving the first collector in two dimensions between receiving the first object at the first collector and receiving the second object at the first collector; and
move the positioner to simultaneously transfer the plurality of objects from the first collector to a second collector so that the plurality of objects are arranged in the second collector according to the pre-determined pattern.

11. The device of claim 10, wherein the instructions to arrange the first plurality of objects in the first collector comprise instructions to automatically move the first collector in three dimensions between receiving the first object at the first collector and receiving the second object at the first collector.

12. The device of claim 10, wherein the instructions to move the first collector in two dimensions comprise instructions to rotate the first collector.

13. The device of claim 10, wherein the instructions to move the first collector in two dimensions comprise instructions to move the first collector in two Cartesian dimensions.

14. The device of claim 10, wherein the instructions to move the first collector in two dimensions comprise instructions to rotate the first collector and move the first collector in a Cartesian dimension.

15. The device of claim 10, wherein the instructions to arrange the first plurality of objects in the first collector comprise instructions to automatically move the first collector in six dimensions between receiving the first object at the first collector and receiving the second object at the first collector.

16. The device of claim 10, wherein the instructions to arrange the first plurality of objects in the first collector comprise instructions to automatically rotate a first face of the first collector relative to a second face of the first collector to provide an opening to receive the first plurality of objects.

17. The device of claim 10, wherein the instructions to arrange the first plurality of objects in the first collector comprise instructions to compress a footprint of the first plurality of objects by automatically moving a first face of the collector laterally relative to a second face of the collector.

18. The device of claim 10, further comprising:
an accumulator assembly configured to accumulate the first plurality of objects.

19. The device of claim 18, further comprising:
a feed assembly configured to serially provide the first plurality of objects from the accumulator assembly to the first collector.

20. The device of claim 19, wherein the accumulator assembly comprises a plurality of conveyer beds.

* * * * *